United States Patent [19]

Kirkpatrick et al.

[11] Patent Number: 4,934,513
[45] Date of Patent: Jun. 19, 1990

[54] CONVEYOR BELT DISCHARGE APPARATUS

[75] Inventors: John W. Kirkpatrick, La Habra; Eric C. Lawrence, Rosemead, both of Calif.

[73] Assignee: Lawrence Equipment, Inc., So. El Monte, Calif.

[21] Appl. No.: 260,192

[22] Filed: Oct. 19, 1988

[51] Int. Cl.$^5$ .............................................. B65G 29/00
[52] U.S. Cl. .................................................... 198/612
[58] Field of Search ............... 198/496, 498, 608, 611, 198/612, 780; 193/37; 99/450.6

[56] References Cited

U.S. PATENT DOCUMENTS 1,273,796  7/1918  Bleile .................................... 198/612
2,677,900  5/1954  Mann .................................... 198/611

FOREIGN PATENT DOCUMENTS 3217475  11/1983  Fed. Rep. of Germany ...... 198/611

Primary Examiner—Joseph E. Valenza
Attorney, Agent, or Firm—Lyon & Lyon

[57] ABSTRACT

A conveyor belt discharge apparatus located between a first and a second conveyor belt, which removes flattened dough balls adhering to the first conveyor belt and transports the dough balls to the second conveyor belt by a rotational movement of the apparatus in which a plurality of resilient sheets of the apparatus make periodic conforming contact with the discharge end of the first conveyor belt.

8 Claims, 1 Drawing Sheet

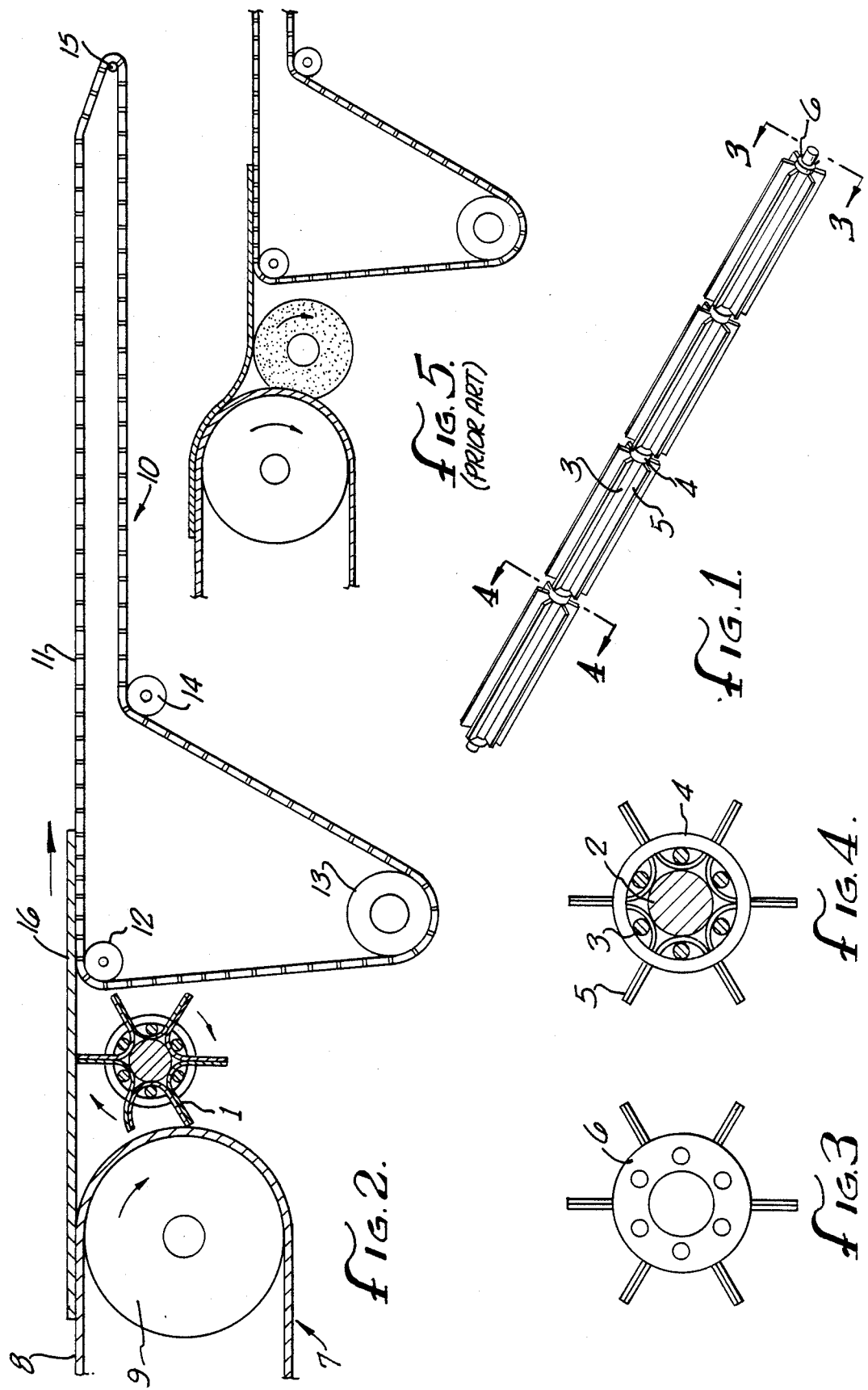

CONVEYOR BELT DISCHARGE APPARATUS

BACKGROUND OF THE INVENTION

This invention relates to a conveyor belt discharge apparatus, and more particularly concerns an apparatus and a method for removing flattened dough balls from a first conveyor belt and transferring them onto a second conveyor belt without damage to the flattened dough balls. The apparatus and method can be used for the removal of any article adhering to a conveyor belt, such as pizza shells or tortillas, but will be discussed in the context of tortillas.

Tortillas can be removed from one conveyor belt and transported to another by manual labor, but this is not commercially acceptable, because labor is relatively expensive and workers have difficulty removing the hot tortillas at the speed necessary for large volume commercial production. Workers also create disuniform spacing between tortillas and damage the tortillas, because of their tendency to adhere to the conveyor belt surface. In order to efficiently process tortillas there is a need to automate removal.

A prior attempt involved use of a foam roller, which was located immediately adjacent to the discharge end of the first conveyor belt. The foam roller consisted of a series of annular rings of closed cell polyethylene foam forming a tube fixedly secured around a driven shaft. As shown in FIG. 5, the first conveyor belt compresses the surface of the foam roller at the point of contact, so that the foam roller conforms to the curvature of the discharge end of the first conveyor belt. The surface of the foam roller catches the edge of the tortilla adhering to the belt and peels the tortilla away from the belt by a rotational movement opposite to the direction of belt movement and then the foam roller transports and places it on the receiving end of the second conveyor belt, which travels in the same direction as the first conveyor belt. Continued movement of the first and second conveyor belts, and of the foam roller, plus friction between the tortilla and the second conveyor belt, all work to transport the entire tortilla onto the second conveyor belt.

However, the foam roller is not an entirely satisfactory solution toward automated removal, because it wears out very rapidly, normally in one to seven days depending on conditions, and requires frequent replacement with resulting production down time. Once the foam roller is worn, it will not conform to the curved portion of the first conveyor belt during operation, which allows tortillas to stick to the first conveyor belt or fall in between the foam roller and either the first or second conveyor belts.

The present invention overcomes this basic problem by providing a conveyor belt discharge apparatus, which is extremely durable and requires little production down time for replacement. Preliminary tests indicate the present invention lasts approximately 20 to 150 times longer than a foam roller. Moreover, the replacement of worn out components of the present invention can be done within a few minutes by axially removing the component parts without movement of the first and second conveyor belt.

SUMMARY OF THE INVENTION

The present invention is directed to an apparatus for the removal of flattened dough balls adhering to a first conveyor belt and transporting the flattened dough balls to the receiving end of a second conveyor belt located adjacent to the discharge end of the first conveyor belt and running in the same direction.

Another object of the invention is to provide a durable conveyor belt discharge apparatus which will greatly reduce production down time for repairs.

Another object is to provide a conveyor belt discharge apparatus which is easily cleaned and can be quickly disassembled for either more complete cleaning or for any necessary replacement of its component parts.

Other objects and features of the present invention will appear from the following description and the accompanying drawings.

BRIEF DESCRIPTION OF THE DRAWINGS

FIG. 1 is a perspective view of the conveyor belt discharge apparatus of this invention.

FIG. 2 is a side elevation view illustrating the relative location of the first and second conveyor belts, the conveyor belt discharge apparatus of this invention, and the tortilla during operation of the process.

FIG. 3 is an end view taken substantially on the line 3—3 in FIG. 1 illustrating a ring shaped end cap of the conveyor belt discharge apparatus.

FIG. 4 is a sectional view taken substantially on the line 4—4 in FIG. 1 illustrating the configuration of the driven shaft, the surrounding rods, the resilient sheets, and the rings of the conveyor belt discharge apparatus of this invention.

FIG. 5 is an end view of a prior art system illustrating the relative location of the first and second conveyor belts, the prior art tortilla removal device, and the tortilla during operation of the process.

DETAILED DESCRIPTION OF THE PREFERRED EMBODIMENT

Turning now to the drawings, the flattened dough ball processing apparatus illustrated in FIG. 2 includes a first conveyor 7, a conveyor belt discharge apparatus 1, and a second conveyor 10, and means for driving these component parts (not shown). In the preferred embodiment, the top surface of the first and second conveyors 7 and 10, respectively, and an outer edge of a resilient sheet 5 at its highest point of rotation are at the same height. However, the top surface of the first conveyor 7 can also be located above or slightly below the outer edge of a resilient sheet 5 at its highest point of rotation. In addition, the top surface of the second conveyor 10 can be located below the top edge of a resilient sheet 5 at its highest point of rotation.

The first conveyor 7 has a flat press belt 8 supported horizontally between two end rollers (only the end roller on the right side, the drive roller 9 is shown in FIG. 2). The belt 8 is sufficiently wide to accommodate processing rows of tortillas side-by-side. The belt 8 is preferably made of teflon coated fiberglass. The belt 8 is part of a tortilla heating press in which dough balls are simultaneously pressed flat on the belt 8 and heated which causes them to stick to the belt 8, as further described below.

The conveyor belt discharge apparatus 1 is located adjacent to the discharge end of the first conveyor 7 and is of approximately the same width. The conveyor belt discharge apparatus 1 includes a driven shaft 2, which is parallel to, and rotates in the same direction as the drive roller 9 of the first conveyor 7. The driven shaft 2 preferrably rotates 2-8% rpm faster (5% faster is optimal) than the drive roller 9 to produce a greater linear speed at the outer edge of each resilient sheet 5 than the linear speed of belt 8. A plurality of rods 3 are located concentrically around, and parallel to, the driven shaft 2. A pair of ring shaped end caps 6 with a plurality of concentrically arranged holes in the ring portion serve to locate and secure the rods 3 onto the driven shaft 2. A plurality of circular rings 4 are spaced in between the ring shaped end caps 6 for restricting radial movement of the rods 3. A plurality of resilient sheets 5 are interposed between the ring shaped end caps 6 and the rings 4, and are bent into parabola-like shaped members by confinement of the resilient sheets between the driven shaft 2, the rods 3, and those resilient sheets 5 which are immediately adjacent on either side (see FIG. 4). The resilient sheets 5 are preferably made of teflon coated fiberglass although other materials with similar properties can be used.

As shown in FIG. 2, the second conveyor 10 is normally of a metal mesh type belt 11. The belt 11 is driven by mesh driver roller 13, has an idle roller 12 immediately above it, and is preceded by a take up shaft 14. The discharge end of the second conveyor 10 has a nose bar 15. This particular arrangement of the second conveyor 10 is a typical installation but other entirely different arrangements will also work as long as the first and second conveyors, 7 and 10, respectively, (1) travel in the same direction, and (2) the second conveyor belt 11 travels faster in fpm than the first conveyor belt 8.

The method of operation will now be described. A ball of dough which ultimately forms a tortilla 16 is positioned on the belt 8, which travels from left to right to a location under a parbaking press unit (not shown). The heated platten of the parbaking press unit is urged downward at a high force to both cook and completely flatten the dough ball to form the tortilla 16. Usually parbaking will cause the tortilla 16 to at least partially release from the belt 8, however, sometimes the tortilla 16 adheres to the belt 8 and requires removal by the conveyor belt discharge apparatus 1.

As shown in FIG. 2, the conveyor belt discharge apparatus 1 forms a paddle wheel structure. The outer edge of the resilient sheets 5 make periodic conforming contact with the belt 8 at the discharge end of the first conveyor 7. The outer edge of one of the resilient sheets 5 catches the leading edge of the tortilla 16 adhering to the belt 8 and peels the tortilla 16 away from the belt 8 by a rotational movement in the opposite direction of the movement of the belt 8. The resilient sheet 5 then transfers the front edge of the tortilla 16 onto the receiving end of the belt 11 of the second conveyor 10, which travels in the same direction as the first conveyor 7. Continued movement of the first and second conveyor belts, 8 and 11, respectively, and the conveyor belt discharge apparatus 1, plus friction between the tortilla 16 and the belt 11, all work to transport the entire tortilla 16 onto the second conveyor belt 10.

The novel configuration of the conveyor belt discharge apparatus 1 allows workers to easily and quickly disassemble the apparatus for either cleaning or for any necessary repairs of its component parts. The ring shaped end cap 6 is simply pulled off the driven shaft 2 and the surrounding rods 3 from either end of the apparatus. This allows access to the plurality of resilient sheets 5 which can then be pulled off in the same axial direction. Each of the rings 4 can then be pulled off in the same axial direction. Thus, the entire conveyor belt discharge apparatus 1 can be completely disassembled, without any required movement of the first and second conveyor belts, 8 and 11, respectively, or even the removal of the driven shaft 2 from the apparatus. Further, if the end cap 6 is removed from the end of driven shaft 2 that does not include the driving mechanism, then such driving mechanism need not be disturbed.

While the invention has been described in connection with a particular embodiment it is understood that the invention is not limited to the details set forth in the specification or the details shown in the drawings but rather the invention is of the full scope of the appended claims.

What is claimed:

1. An apparatus for periodic transporting of an article comprising:
    a driven shaft;
    a plurality of surrounding rods located concentrically around, and parallel to, the driven shaft;
    a pair of ring shaped end caps with a plurality of concentrically arranged holes in a ring portion for securing the surrounding rods and the driven shaft together, in which the driven shaft fits within a central hole of the ring shaped end cap and the surrounding rods fit within said concentrically arranged holes in the ring portion of the ring shaped end caps; and
    a plurality of resilient sheets interposed between the ring shaped end caps and bent into parabola-like shaped members by the confinement of the resilient sheets between the driven shaft, the surrounding rods, and the resilient sheets which are adjacent.

2. An apparatus as defined in claim 1, wherein plural sets of resilient sheets are positioned along said driven shaft, a ring is positioned between each pair of sets, and each ring encircles and radially confines said surrounding rods.

3. An apparatus as defined in claim 1 or 2, wherein the resilient sheets are of teflon coated fiberglass.

4. An apparatus for removing material adhering to a first conveyor belt and transporting the material to a second conveyor belt, which comprises:
    a conveyor belt discharge apparatus having a driven shaft;
    a plurality of surrounding rods located concentrically about and parallel to the driven shaft;
    a pair of ring shaped end caps with a plurality of concentrically arranged holes in a ring portion for fixedly securing the surrounding rods and the driven shaft together in a single structure in which the driven shaft fits within a central hole of the ring shaped end caps and the surrounding rods fit within the concentrically arranged holes in the ring portion of the ring shaped end caps;
    a plurality of rings spaced between the ring shaped end caps for confining radial movement of the surrounding rods;
    a plurality of resilient sheets axially spaced between the ring shaped end caps and the rings, each sheet being bent into parabola-like shaped members by the confinement of the sheets between the driven shaft, the surrounding rods, and adjacent resilient sheets;
    the first conveyor belt located so that an outer edge of the resilient sheets of the conveyor belt discharge apparatus makes periodic conforming contact with a discharge end of the first conveyor belt;

the second conveyor belt with a receiving end adjacent to the discharge end of the first conveyor belt and which travels in the same direction as the first conveyor belt;

means for rotating the driven shaft of the conveyor belt discharge apparatus, the first conveyor belt, and the second conveyor belt for causing the outer edges of the resilient sheets to engage and remove the material from the first conveyor belt and transport the material to the second conveyor belt.

5. An apparatus as defined in claim 4, wherein the first conveyor belt is located so that a top surface of the belt is above or substantially equal to the highest point of rotation attained by the resilient sheets of the conveyor belt discharge apparatus.

6. An apparatus as defined in claim 4 or 5, wherein the second conveyor belt is located so that a top surface of the belt is below or substantially equal to the highest point of rotation attained by the resilient sheets of the conveyor belt discharge apparatus.

7. An apparatus as defined in claim 4, wherein the means for rotating the driven shaft of the conveyor belt discharge apparatus, and the first and the second conveyor belts, drives the second conveyor belt at a faster rate of speed than the first conveyor belt.

8. An apparatus as defined in claim 4 or 7, wherein the means for rotating the driven shaft of the conveyor belt discharge apparatus, and the first and the second conveyor belts, drives the driven shaft at a speed of rotation for producing a greater linear speed of the outer edges of the resilient sheets than the linear speed of the first conveyor belt.

* * * * *